(12) United States Patent
Aizono

(10) Patent No.: US 11,245,797 B2
(45) Date of Patent: Feb. 8, 2022

(54) IMAGE FORMING APPARATUS, MALFUNCTION DIAGNOSIS METHOD OF IMAGE FORMING APPARATUS, AND STORAGE MEDIUM

(71) Applicant: CANON KABUSHIKI KAISHA, Tokyo (JP)

(72) Inventor: Keisuke Aizono, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/727,081

(22) Filed: Dec. 26, 2019

(65) Prior Publication Data

US 2020/0220984 A1    Jul. 9, 2020

(30) Foreign Application Priority Data

Jan. 7, 2019    (JP) .............................. JP2019-000739

(51) Int. Cl.
*H04N 1/00*    (2006.01)
(52) U.S. Cl.
CPC ..... *H04N 1/00092* (2013.01); *H04N 1/00663* (2013.01); *H04N 1/00689* (2013.01);
(Continued)
(58) Field of Classification Search
CPC ........... H04N 1/00092; H04N 1/00899; H04N 1/00689; H04N 1/00663;
(Continued)

(56) References Cited

U.S. PATENT DOCUMENTS

| | | | | |
|---|---|---|---|---|
| 5,946,521 A | * | 8/1999 | Budnik | ............. G03G 15/5033 399/24 |
| 8,121,497 B2 | * | 2/2012 | Yamada | ............... G03G 15/502 399/21 |

(Continued)

FOREIGN PATENT DOCUMENTS

JP    2005237046 A    9/2005

OTHER PUBLICATIONS

Yuhuang Zheng, Di Li, Feng Ye, Qingsong Jiao, Rotogravure Printing Press Fault Diagnosis System (English), Published: Dec. 1, 2008, 2008 IEEE International Symposium on Knowledge Acquisition and Modeling Workshop (pp. 324-327).*

*Primary Examiner* — Marcus T Riley
*Assistant Examiner* — Darryl V Dottin
(74) *Attorney, Agent, or Firm* — Venable LLP

(57) ABSTRACT

The present invention provides an image forming apparatus and a malfunction diagnosis method of the image forming apparatus. The image forming apparatus stores a diagnosis target of a malfunction in association with a diagnostic item corresponding to the diagnosis target, and in a case where an abnormality is detected, the apparatus specifies the diagnosis target corresponding to the abnormality, executes a malfunction diagnosis process in accordance with the stored diagnostic item in association with the specified diagnosis target, and displays information regarding a malfunction parts determined to be a malfunction by the malfunction diagnosis process. The apparatus executes a malfunction diagnosis processes of a different type depending on whether or not a sheet remaining in the image forming apparatus is detected.

17 Claims, 16 Drawing Sheets

(52) U.S. Cl.
CPC ........... H04N 1/00899 (2013.01); *H04N 1/00* (2013.01); *H04N 1/001* (2013.01); *H04N 2201/0001* (2013.01); *H04N 2201/0082* (2013.01)

(58) Field of Classification Search
CPC ... H04N 2201/0001; H04N 2201/0082; H04N 1/00; H04N 1/001
USPC ....................................................... 358/1.14
See application file for complete search history.

(56) References Cited

U.S. PATENT DOCUMENTS

| | | | |
|---|---|---|---|
| 2005/0262394 A1* | 11/2005 | Yasukawa ........... | G06F 11/0733 714/23 |
| 2008/0266582 A1* | 10/2008 | Sakura .................. | G06F 3/1242 358/1.6 |
| 2013/0136461 A1* | 5/2013 | Sakai ...................... | G03G 15/70 399/18 |
| 2014/0368895 A1* | 12/2014 | Teramoto ........... | H04N 1/00689 358/498 |

\* cited by examiner

F I G. 4

| DIAGNOSIS TARGET | POWER SUPPLY MODULE | SIGNAL OUTPUT UNIT | CONTROL CIRCUIT UNIT | LOAD OPERATION UNIT |
|---|---|---|---|---|
| ATTACHMENT/ DETACHMENT MOTOR | +24V_B_FU | MOTOR CONTROL SIGNAL | SPACING MOTOR DRIVING CIRCUIT | INTERMEDIATE TRANSFER BELT ATTACHMENT/DETACHMENT MECHANISM |
| FAN MOTOR | +24V_B_FU | MOTOR CONTROL SIGNAL | FAN MOTOR DRIVING CIRCUIT | FAN |
| MONOCHROME DRUM MOTOR | +24V_B_FU | MOTOR CONTROL SIGNAL | MONOCHROME DRUM MOTOR DRIVING CIRCUIT | MONOCHROME PHOTOSENSITIVE DRUM |
| COLOR DRUM MOTOR | +24V_B_FU | MOTOR CONTROL SIGNAL | COLOR DRUM MOTOR DRIVING CIRCUIT | COLOR PHOTOSENSITIVE DRUM |
| FIXING MOTOR | +24V_B_FU | MOTOR CONTROL SIGNAL | FIXING MOTOR DRIVING CIRCUIT | FIXING UNIT |
| CHARGING DC OUTPUT | +24V_A_FU | HIGH VOLTAGE CONTROL SIGNAL | CHARGING DC HIGH-VOLTAGE CIRCUIT | CHARGING ROLLER |
| DEVELOPMENT DC OUTPUT | +24V_A_FU | HIGH VOLTAGE CONTROL SIGNAL | DEVELOPMENT DC HIGH-VOLTAGE CIRCUIT | DEVELOPER |
| PRIMARY TRANSFER DC OUTPUT | +24V_A_FU | HIGH VOLTAGE CONTROL SIGNAL | PRIMARY-TRANSFER DC HIGH-VOLTAGE CIRCUIT | PRIMARY TRANSFER ROLLER |
| SECONDARY TRANSFER DC OUTPUT | +24V_A_FU | HIGH VOLTAGE CONTROL SIGNAL | SECONDARY TRANSFER DC HIGH-VOLTAGE CIRCUIT | SECONDARY TRANSFER ROLLER |

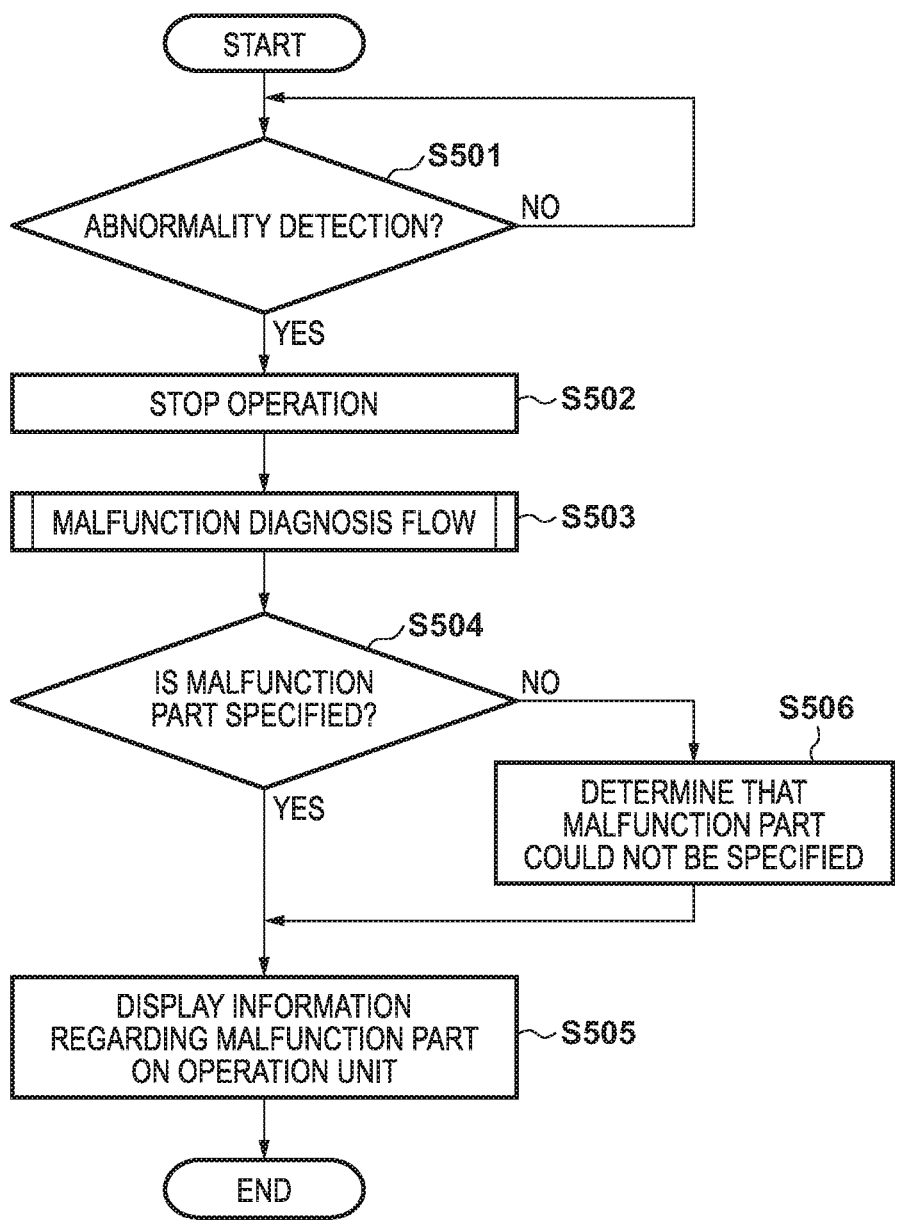

MONOCHROME CONTACT POSITION

ALL COLOR CONTACT POSITION

ALL COLOR RELEASE POSITION

F I G. 12

| ERROR CODE | MALFUNCTION DIAGNOSIS TYPE | ABNORMALITY DETECTION CONTENT |
|---|---|---|
| E001 | 1 | DEVELOPER (YELLOW) TONER DENSITY ABNORMALITY |
| E002 | 1 | DEVELOPER (MAGENTA) TONER DENSITY ABNORMALITY |
| E003 | 1 | DEVELOPER (CYAN) TONER DENSITY ABNORMALITY |
| E004 | 1 | DEVELOPER (BLACK) TONER DENSITY ABNORMALITY |
| E005 | 1 | FAN ROTATION ABNORMALITY |
| E006 | 2 | INTERMEDIATE TRANSFER BELT ATTACHMENT/DETACHMENT MECHANISM ABNORMALITY |
| E007 | 1 | MONOCHROME DRUM MOTOR ROTATION ABNORMALITY |
| E008 | 1 | COLOR DRUM MOTOR ROTATION ABNORMALITY |
| E009 | 1 | FIXING MOTOR ROTATION ABNORMALITY |
| ... | ... | ... |

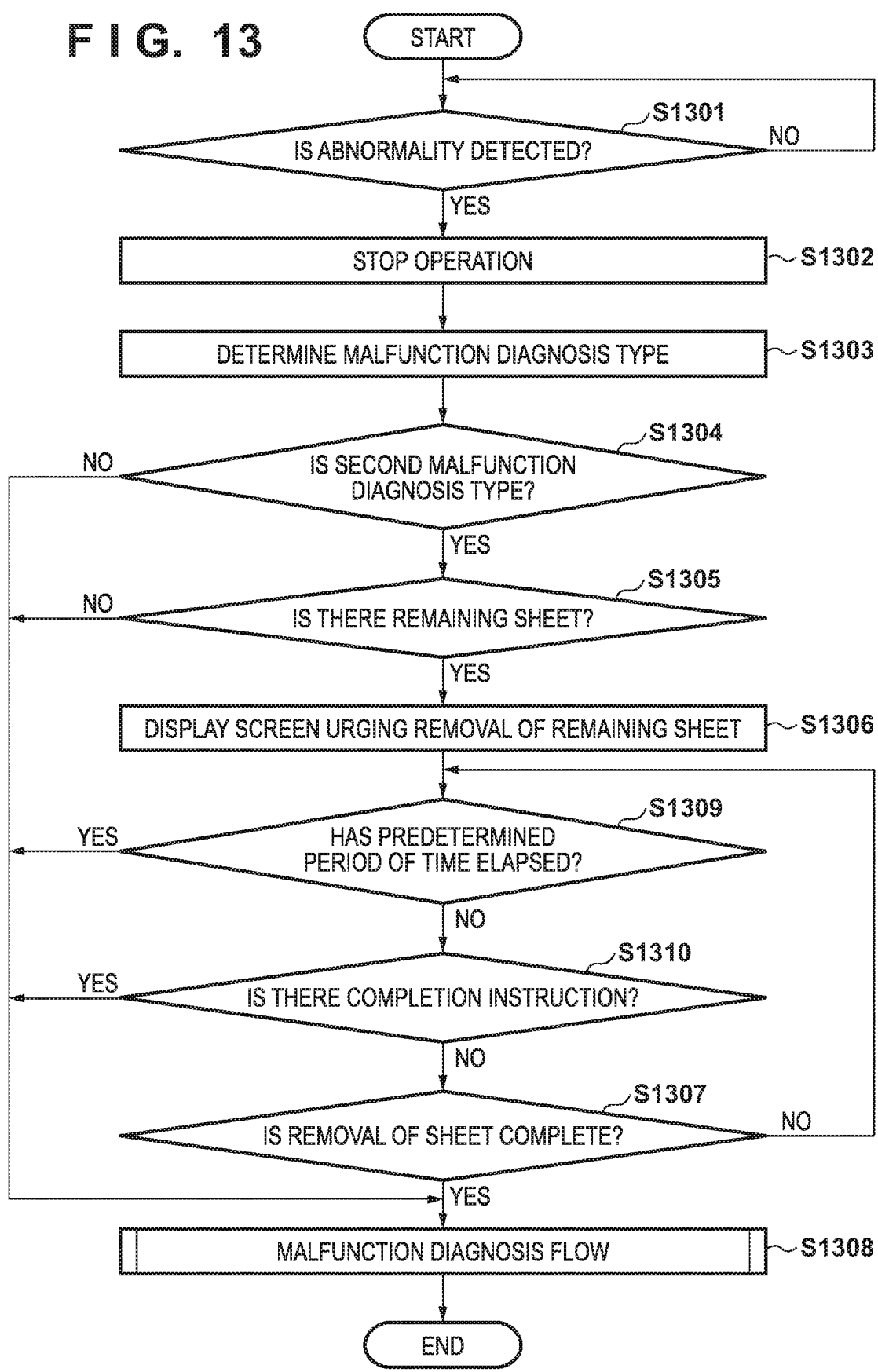

IMAGE FORMING APPARATUS, MALFUNCTION DIAGNOSIS METHOD OF IMAGE FORMING APPARATUS, AND STORAGE MEDIUM

BACKGROUND OF THE INVENTION

Field of the Invention

The present invention relates to an image forming apparatus, a malfunction diagnosis method of an image forming apparatus, and a storage medium.

Description of the Related Art

Conventionally, when an abnormality in operation of various controls is detected, an image forming apparatus displays an error code indicating the content of the detected abnormality on an operation unit to notify a user of the occurrence of an error. As a result, the user notifies a call center of the occurrence of a malfunction of the apparatus via a network, and a service person then performs repair based on the error code to thereby have the operation of service support for recovering the apparatus from the malfunction. However, when the service person performs repair based on an error code at a job site, there is a problem that it requires a significant amount of time to specify where the malfunction part was, and in the meantime, the user is inconvenienced.

In view of this, Japanese Patent Laid-Open No. 2005-237046, for example, describes a method for distinguishing between malfunctions of a high-voltage power supply and a charging wire. By specifying the malfunction part by such distinguishing, the work time of the service person is shortened, and the time required for service support is shortened.

Further, an abnormality of an image forming apparatus is not limited to a high-voltage power supply unit, but includes many things within the apparatus, and there are many error codes generated in accordance with an abnormality. For such a large number of error codes, in order to specify a malfunction part, a malfunction part specifying diagnosis flow (hereinafter referred to as a malfunction diagnosis flow) is provided for each error code. When a malfunction diagnosis flow corresponding to an individual error code is executed, a load such as a motor or a high voltage is caused to operate in order to specify a malfunction part. Therefore, there are cases where the malfunction diagnosis flow cannot be started unless the state of the image forming apparatus satisfies a specification condition.

More specifically, for example, when executing a malfunction diagnosis flow that causes an intermediate transfer belt to operate, consideration is given to a case where, due to jamming, a sheet remains between the intermediate transfer belt and a secondary transfer roller for transferring a toner image on the intermediate transfer belt to the sheet. If the malfunction diagnosis flow is started in such a state, there is a possibility that, for example, the remaining sheet will be damaged, and the intermediate transfer belt will be damaged. Therefore, in the above-described example, there is a method in which the user removes the remaining sheet in a case of executing the malfunction diagnosis flow which causes the intermediate transfer belt to operate. That is, when a load to cause to operate in the malfunction diagnosis flow executed for each individual error code is the intermediate transfer belt, the user is notified to remove the remaining sheet, and the malfunction diagnosis flow can be started only after the remaining sheet is removed.

However, even if the user is notified to remove the remaining sheet as described above, that the user may leave the sheet as it is without performing a corresponding action is considered. In such a case, the malfunction diagnosis flow is not started, and the user cannot be appropriately notified of the state including the fact that malfunction diagnosis cannot be performed.

SUMMARY OF THE INVENTION

An aspect of the present invention is to eliminate the above-mentioned problem with conventional technology.

A feature of the present invention is to provide a technique capable of, when some kind of abnormality is detected, executing a malfunction diagnosis process corresponding to the abnormality.

According to a first aspect of the present invention, there is provided an image forming apparatus, comprising: a memory device that stores instructions; and at least one processor that executes the instructions stored in the memory device to cause the image forming apparatus to function as: a storage unit configured to store a diagnosis target of a malfunction in association with a diagnostic item corresponding to the diagnosis target; a specification unit configured to, in a case where an abnormality is detected, specify the diagnosis target corresponding to the abnormality; an execution unit configured to execute a malfunction diagnosis process in accordance with the diagnostic item stored in the storage unit in association with the specified diagnosis target; and a display unit configured to display information regarding a malfunction parts determined to be a malfunction by the malfunction diagnosis process, wherein the execution unit executes a malfunction diagnosis processes of a different type depending on whether or not a sheet remaining in the image forming apparatus is detected.

According to a second aspect of the present invention, there is provided a malfunction diagnosis method of an image forming apparatus having a storage unit operable to store a diagnosis target of a malfunction in association with a diagnostic item corresponding to the diagnosis target, the method comprising: in a case where an abnormality is detected, specifying the diagnosis target corresponding to the abnormality; executing a malfunction diagnosis process in accordance with a diagnostic item stored in the storage unit in association with the specified diagnosis target; and displaying information regarding a malfunction part that is determined to be a malfunction by the malfunction diagnosis process, wherein a malfunction diagnosis processes of a different type is executed depending on whether or not a sheet remaining in the image forming apparatus is detected.

Further features of the present invention will become apparent from the following description of exemplary embodiments with reference to the attached drawings.

BRIEF DESCRIPTION OF THE DRAWINGS

The accompanying figures, which are incorporated in and constitute a part of the specification, illustrate embodiments of the invention and, together with the description, serve to explain the principles of the invention.

FIG. 4 depicts a view illustrating an example of a malfunction diagnosis table in the image forming apparatus according to the embodiment.

FIG. 5 is a flowchart for describing processing when a malfunction occurs in the image forming apparatus according to the embodiment.

FIG. 12 depicts a view illustrating an example of a malfunction diagnosis type table according to the embodiment.

FIG. 13 is a flowchart for describing processing when the image forming apparatus according to the embodiment detects a malfunction of the second malfunction diagnosis type.

DESCRIPTION OF THE EMBODIMENTS

Embodiments of the present invention will be described hereinafter in detail, with reference to the accompanying figures. It is to be understood that the following embodiments are not intended to limit the claims of the present invention, and that not all of the combinations of the aspects that are described according to the following embodiments are necessarily required with respect to the means to solve the problems according to the present invention.

Figure 1:
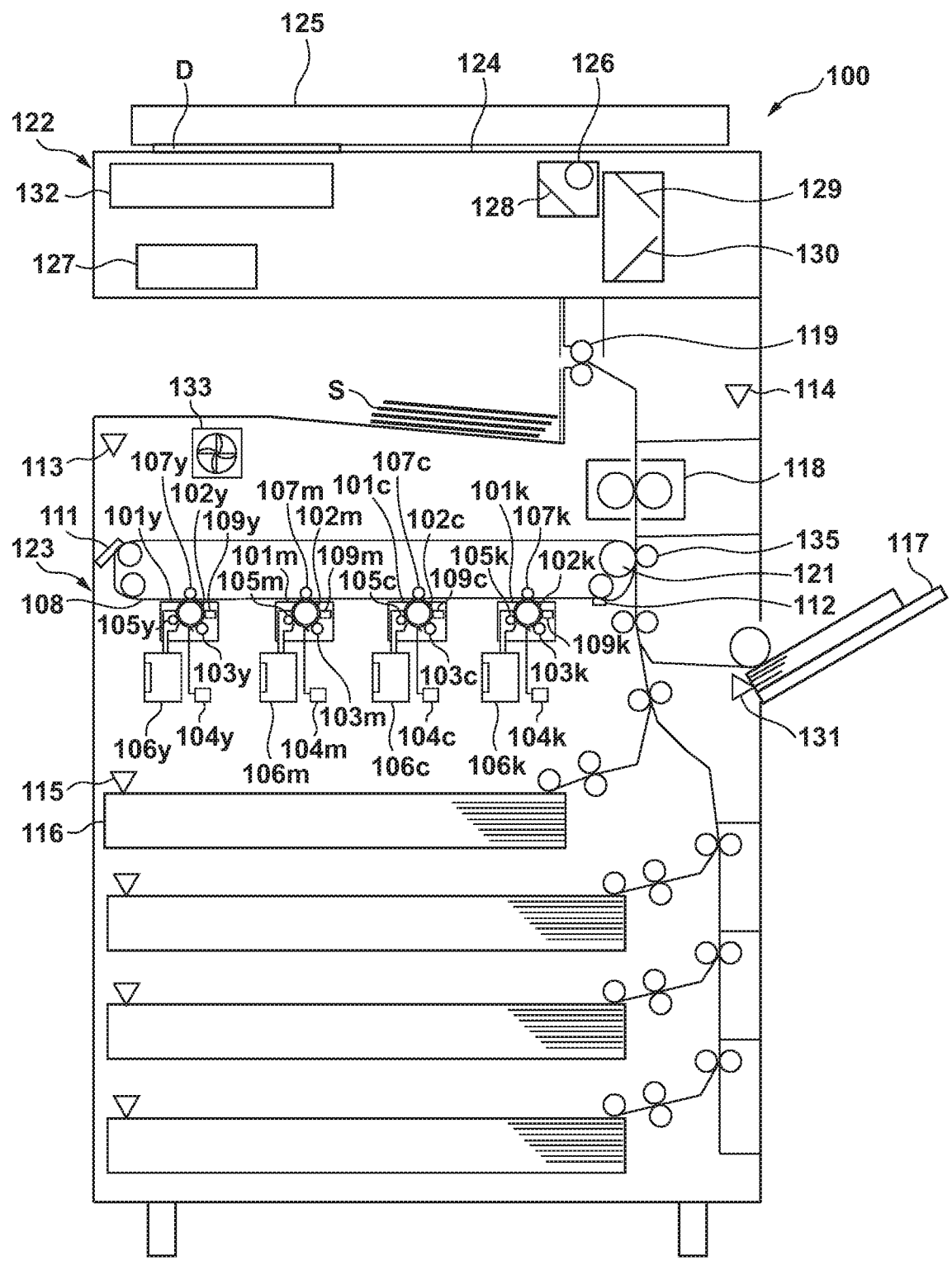
FIG. 1 depicts a schematic cross-sectional view illustrating a configuration of an image forming apparatus according to an embodiment of the present invention.

FIG. 1 depicts a schematic cross-sectional view illustrating a configuration of an image forming apparatus 100 according to an embodiment of the present invention.

The image forming apparatus 100 includes an image reading unit 122, which includes a scanner, and an image forming unit 123 which is a printing unit. An original platen 124 made of a transparent glass plate is provided above the image reading unit 122. An original D placed on a predetermined position of the original platen 124 with the image surface facing downward is pressed and fixed by an original pressure cover 125. An optical system that includes a lamp 126 for illuminating the original D and reflecting mirrors 128, 129, and 130 for guiding an optical image of the illuminated original D to an image processing unit 127 is provided below the original platen 124. Note that the lamp 126 and the reflecting mirrors 128, 129, and 130 move at a predetermined speed to scan the original D.

The image forming unit 123 includes processing units 101y, 101m, 101c, and 101k arranged on a substantially horizontal straight line at regular intervals. The processing units 101y, 101m, 101c, and 101k form toner images of yellow (y), magenta (m), cyan (c), and black (k) developing agents, respectively. The toner images formed by the processing units 101y, 101m, 101c, and 101k are primary-transferred to the intermediate transfer belt 108 which has come into contact. The toner images of the respective colors superimposed on the intermediate transfer belt 108 are conveyed, and transferred onto the sheet S at the nip where the driving roller 121 and the secondary transfer roller 135 come into contact. Each of the processing units 101y, 101m, 101c, and 101k includes a photosensitive drum 102, a charging roller 103, a laser exposure unit 104, a developer 105, a toner container 106, and an auxiliary charging brush 109. In FIG. 1, reference numerals y, m, c, and k are attached to the ends of the reference numerals corresponding to the respective colors. The image forming unit 123 further includes primary transfer rollers 107y, 107m, 107c, and 107k, an intermediate transfer belt 108, a density sensor 112, a secondary transfer roller 135, and a cleaning device 111.

The sheet S is supplied from the sheet cassette 116 or the manual feed tray 117. Downstream of the image forming unit 123, a fixing unit 118 is provided to fix the toner image on the conveyed sheet S. The sheet S onto which the toner image is fixed by the fixing unit 118 is discharged from the image forming apparatus 100 by a pair of discharge rollers 119.

A front cover (not illustrated) is disposed at the front surface of the image forming apparatus 100, and the front cover is opened to allow access to consumables such as the photosensitive drum 102 and the developer 105. Opening and closing of the front cover is detected by a front cover opening/closing detection sensor 113.

A right cover (not illustrated) is installed at a right side surface of the image forming apparatus 100, and the right cover is opened to allow access to consumables of the intermediate transfer belt 108 or access to remove a sheet remaining due to occurrence of a jam. The opening and closing of the right cover is detected by a right cover opening/closing detection sensor 114.

Each sheet cassette 116 is provided with a sheet cassette opening/closing sensor 115 for detecting the opening/closing of the sheet cassette 116, and a sheet size detecting sensor (not illustrated) for detecting the size of a sheet stored in the sheet cassette 116. When the sheet cassette is closed, the sheet size is automatically detected based on the output of the sheet size detecting sensor. The manual feed tray 117 is provided with a manual feed sheet sensor 131 for detecting the presence or absence of sheets in the manual feed tray 117. When the manual feed sheet sensor 131 detects that a sheet has been placed, a screen prompting a user to set the size of the placed sheet is displayed on the operation unit 132. Then, the user sets the sheet size according to the instruction on the screen, so that the image forming apparatus 100 can grasp the size of the sheet placed on the manual feed tray 117.

Figure 2:
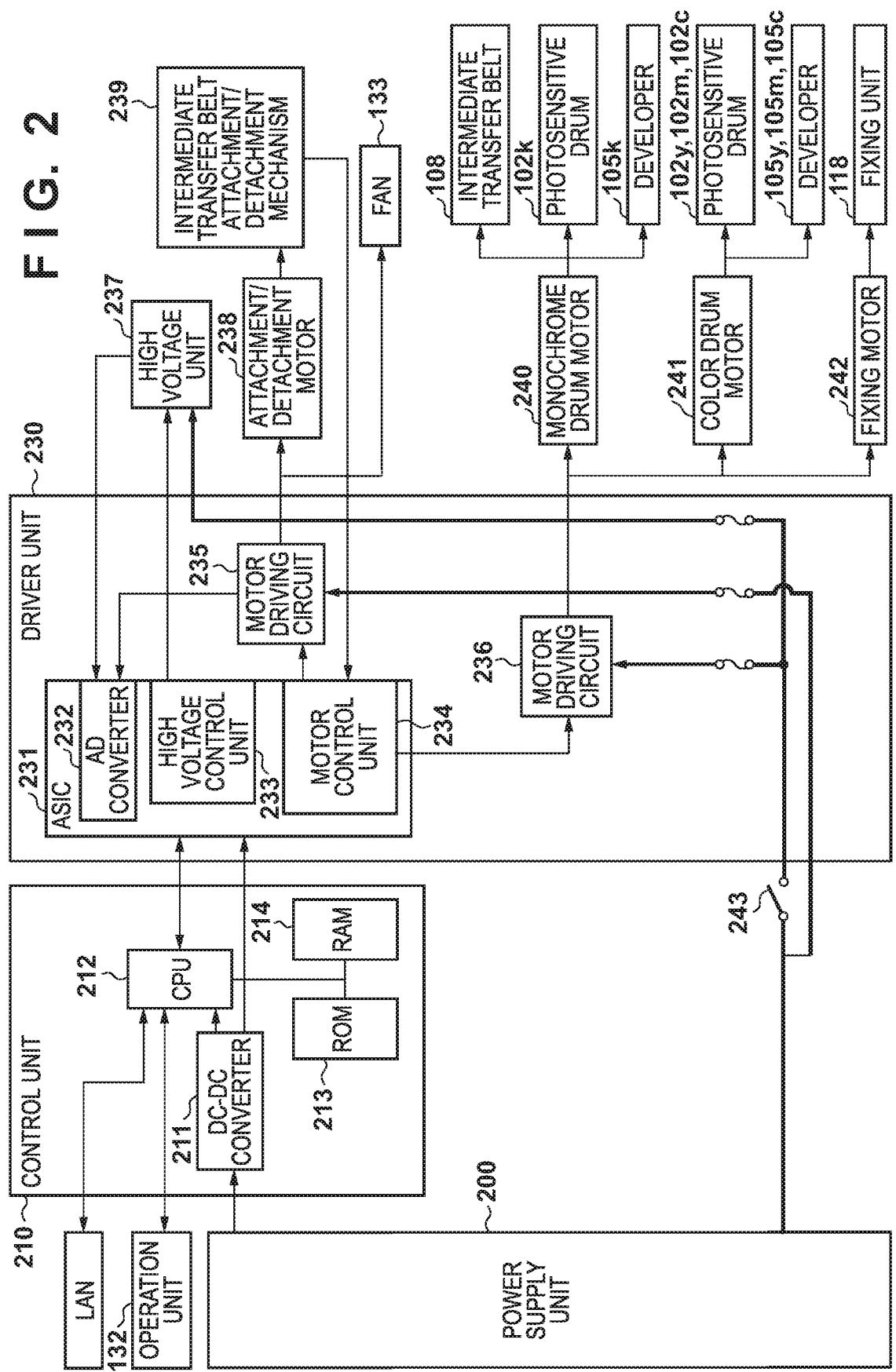
FIG. 2 is a block diagram for describing a power supply system and a control system of a mechanism in the image forming apparatus according to the embodiment.

FIG. 2 is a block diagram for describing a power supply system and a control system of a mechanism in the image forming apparatus 100 according to the embodiment. Here, there are four types of units: a power supply unit 200, a control unit 210, a driver unit 230, and a high voltage unit 237, in which a power supply module, a signal output unit, a control circuit unit, and a load unit are respectively provided.

First, the configuration of the power supply module will be described.

The power supply unit 200 outputs a power supply of +24V, and this power supply voltage is distributed through fuses in the power supply unit 200, and is supplied to each substrate. The control unit 210 steps down the supplied +24V to +3.3V by the DC-DC converter 211, supplies the stepped down power to the CPU 212 and the driver unit 230, and is also used as a power supply of the ASIC (Application Specific Integrated Circuit) 231. The +24V supplied from the power supply unit 200 to the driver unit 230 is further subdivided in the driver unit 230, and is supplied as a power supply of the high voltage unit 237 and the motor driving circuit 235 through respective fuses. The +24V is divided into a power supply system in which power supply is turned on/off by an interlock switch 243 which cuts off power supply in conjunction with an opening/closing operation of the front cover or the right cover, and a power supply system in which power is supplied regardless of the opened/closed states of the covers. In an embodiment, power is supplied to an attachment/detachment motor 238 and a fan 133 regardless of an opened/closed state of the covers.

Next, the control unit 210 will be described.

In order to control the image forming apparatus 100 according to the embodiment, a CPU 212 is provided inside the control unit 210, and the CPU 212 executes various control sequences related to image forming in accordance with programs stored in a ROM 213. In this case, a RAM 214 is installed to store rewritable data that needs to be stored temporarily or permanently. The RAM 214 holds, for example, high voltage setting values for the high voltage unit 237, drive setting information regarding detachable units, and the like. The CPU 212 is connected to an ASIC 231 disposed in the driver unit 230 through serial communication, and controls the ASIC 231 by performing read/write operations on registers or a RAM in the ASIC 231 via this communication.

Next, signal output units inside the ASIC 231 will be described. Inside the ASIC 231 as the signal output units, the following function modules are provided: an A/D converter 232 for taking in analog signal values, a high voltage control unit 233 for controlling the high voltage unit 237, and a motor control unit 234 for controlling a monochrome drum motor 240, a color drum motor 241, a fixing motor 242, the attachment/detachment motor 238, and the fan 133. The fan 133 is provided with a motor (not illustrated) for driving the fan 133. When setting values are written from the CPU 212 through serial communication, the ASIC 231 performs setting of the aforementioned function modules based on the setting values. When a function module is set, the logic circuits of the function module operate based on the setting values, and as a result, a control signal is outputted from the ASIC 231.

Next, the control circuit unit of the driver unit 230 will be described. The control circuit unit includes the high voltage unit 237 and motor driving circuits 235 and 236 for driving the individual motors described above, and the control circuit operates on the basis of the power supply from the power supply unit 200 and the output signal from the signal output unit of the ASIC 231. For example, the motor driving circuit 236 is provided with a driver IC as a circuit for driving the motors, and when a control signal for rotating the motors is input, the driver IC controls rotation of the motors. When the motors rotate, the photosensitive drum 102, the intermediate transfer belt 108, the developer 105, the fixing unit 118, the intermediate transfer belt attachment/detachment mechanism 239, and the fan 133, which are load units of the individual motors, are driven. A home position detection sensor 800 (FIG. 8) provided in the intermediate transfer belt attachment/detachment mechanism 239 detects the attachment/detachment position of the intermediate transfer belt 108, and the detection result is inputted to the ASIC 231. The input value to the ASIC 231 is notified to the CPU 212 through communication, and the CPU 212 controls the position of the intermediate transfer belt attachment/detachment mechanism 239 based on the input value.

Next, the intermediate transfer belt attachment/detachment mechanism 239 will be described with reference to FIGS. 8A to 8C.

Figure 8A:
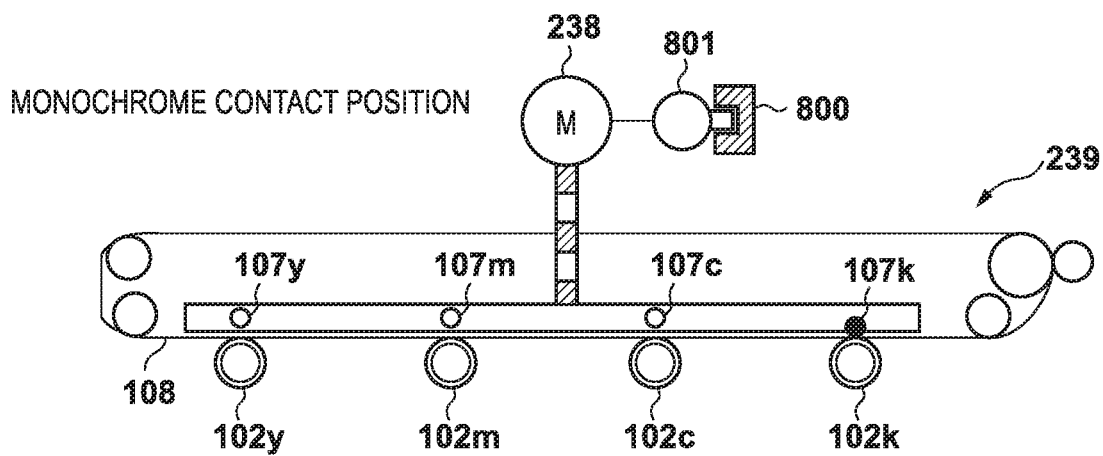
FIGS. 8A to 8C are diagrams for describing an intermediate transfer belt attachment/detachment mechanism for switching the state of contact of an intermediate transfer belt and a primary transfer roller with respect to a photosensitive drum in the image forming apparatus according to the first embodiment.
Figure 8B:
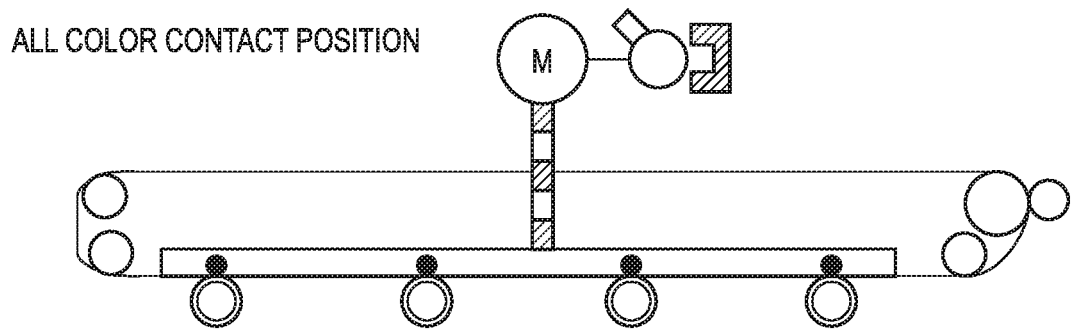
Figure 8C:
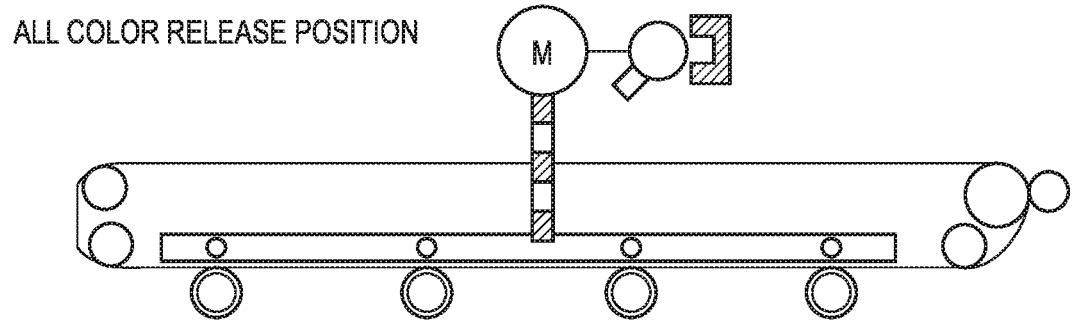

FIGS. 8A to 8C are diagrams for describing the intermediate transfer belt attachment/detachment mechanism 239 for switching the state of contact of the intermediate transfer belt 108 and the primary transfer roller 107 with respect to the photosensitive drum 102 in the image forming apparatus 100 according to the first embodiment.

The intermediate transfer belt attachment/detachment mechanism 239 detects three attachment/detachment positions of the intermediate transfer belt 108 by a home position flag 801 and a home position detection sensor 800 which operate in conjunction with the rotation of the attachment/detachment motor 238 which is a stepping motor.

FIG. 8A illustrates a state in which the home position detection sensor 800 is detecting that the home position flag 801 is in the on state. This state is for a monochrome contact position in which, only the primary transfer roller 107k and the photosensitive drum 102k are in contact with the belt.

FIG. 8B illustrates an all color contact position in which the primary transfer rollers 107 and the photosensitive drums 102 for all colors are in contact with the belt at positions at which the attachment/detachment motor 238 rotates for predetermined pulses after the home position detection sensor 800 detects that the home position flag 801 is off.

FIG. 8C illustrates an all color release position in which the primary transfer rollers 107 and the photosensitive drums 102 for all colors are not in contact with the belt at positions at which the attachment/detachment motor 238 rotates for predetermined pulses after the home position detection sensor 800 detects that the home position flag 801 is off.

When the power supply of the image forming apparatus 100 is activated, the intermediate transfer belt attachment/detachment mechanism 239 moves to the monochrome contact position of FIG. 8A as an initialization operation. After the image formation is started, the intermediate transfer belt attachment/detachment mechanism 239 moves to the monochrome contact position in the case of monochrome image formation, and moves to an all color contact position of FIG. 8B in the case of color image formation. When the right cover is opened, it is determined that the intermediate transfer belt 108 may be replaced, and control is performed so that there is movement to the all color release position of FIG. 8C.

When position control of the intermediate transfer belt attachment/detachment mechanism 239 is executed, if the intermediate transfer belt attachment/detachment control is not completed within a predetermined period of time, it is determined that there is an abnormality in the intermediate transfer belt attachment/detachment mechanism 239. When it is determined that there is an abnormality, a malfunction diagnosis flow for specifying the malfunction part is executed in order to specify the cause of the abnormality. Detailed description of the malfunction diagnosis flow will be described later.

Figure 3:
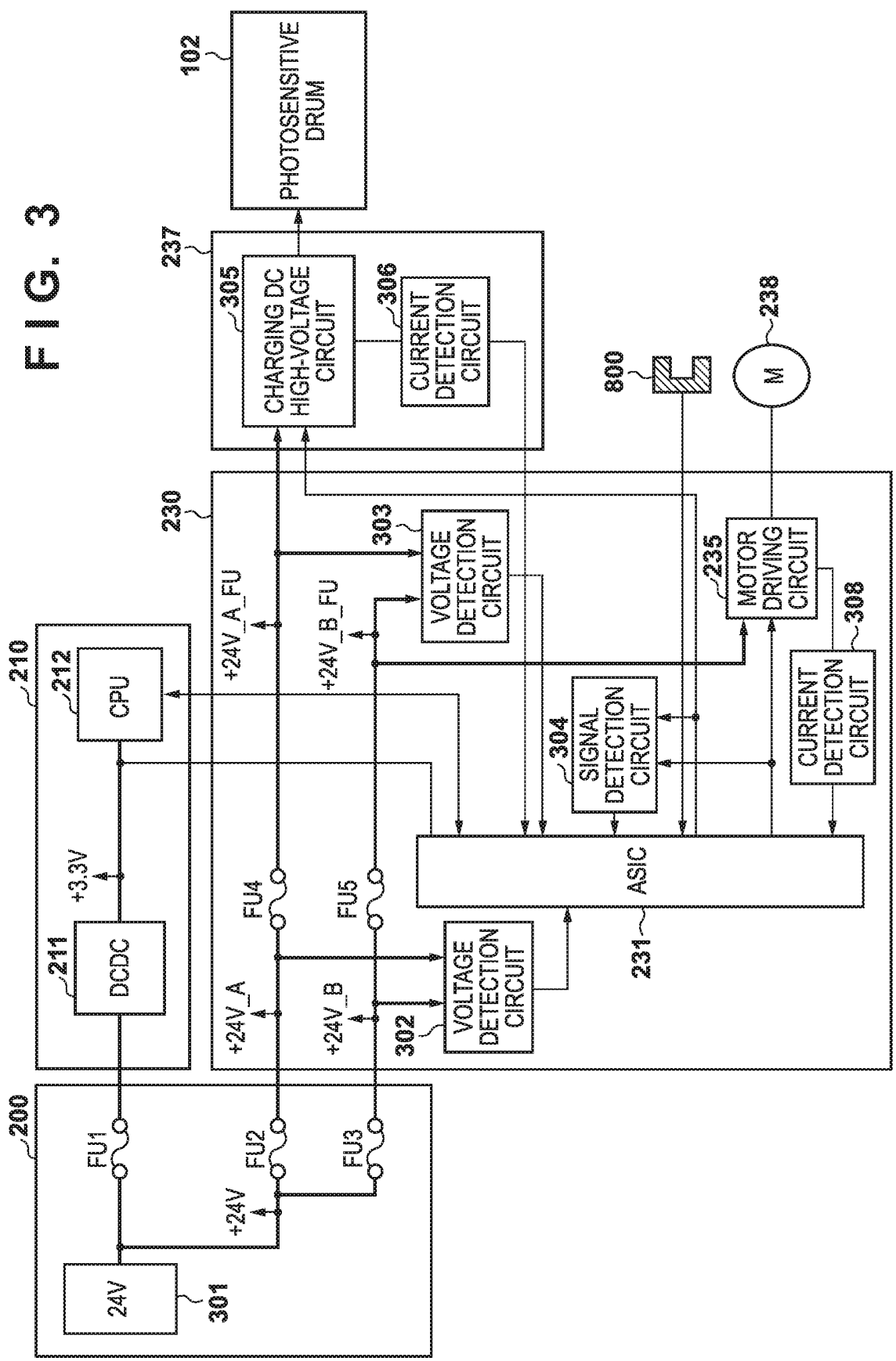
FIG. 3 is a block diagram for describing in more detail an electrical system of the image forming apparatus according to the embodiment.

FIG. 3 is a block diagram for describing in more detail an electrical system of the image forming apparatus 100 according to the embodiment.

The +3.3V generated by the DC-DC converter 211 is supplied to a logical circuit of the ASIC 231 in a similar manner as with the CPU 212, and the +24V generated by the power supply unit 200 is supplied to the driver unit 230 via a fuse FU2 and a voltage detection circuit 302. The detection result of the voltage detection circuit 302 is inputted to the ASIC 231. A signal from the home position detection sensor 800 is also inputted to the ASIC 231.

The motor driving circuit 235 rotationally drives the attachment/detachment motor 238 in accordance with an instruction from the ASIC 231. As a power supply of the motor driving circuit 235, +24V generated by the power supply unit 200 is supplied through fuses FU3, and FU5. A current detection circuit 308 detects the current flowing to the motor driving circuit 235, and inputs the result to the ASIC 231. A signal detection circuit 304 is inputted with a signal output from the ASIC 231 to the motor driving circuit 235 and a signal output from the ASIC 231 to the charging DC high-voltage circuit 305, and outputs a detection result to the ASIC 231. A voltage detection circuit 303 is inputted with the +24V generated by the power supply unit 200 and supplied to the motor driving circuit 235, and the +24V generated by the power supply unit 200 and supplied to the charging DC high-voltage circuit 305, and supplies detection results of these voltages to the ASIC 231. The charging DC high-voltage circuit 305 is a voltage generation circuit that generates a voltage for uniformly charging the surface of the photosensitive drum 102. A current detection circuit 306 detects the current flowing to the charging DC high-voltage circuit 305, and outputs the result of the detection to the ASIC 231.

With such a configuration, the ASIC 231 can detect whether or not the power supply systems of the charging DC high-voltage circuit 305 and the motor driving circuit 235 are normal and whether or not the operation of these circuits is normal, and the CPU 212 can obtain detection results from the ASIC 231.

FIG. 4 depicts a view illustrating an example of a malfunction diagnosis table in the image forming apparatus 100 according to the embodiment.

In this table, a diagnosis target, a power supply and a signal corresponding to the diagnostic item to be supplied, a control circuit related to the diagnosis target, and a load unit driven by the diagnosis target are described in association with each other.

FIG. 5 is a flowchart for describing processing when a malfunction occurs in the image forming apparatus 100 according to the embodiment. Note that the process illustrated in this flowchart is achieved by the CPU 212 executing programs stored in the ROM 213.

First, in step S501, the CPU 212 determines whether or not any abnormality has been detected, and when an abnormality has been detected, the process proceeds to step S502, and the CPU 212 stops the operation of a load for which operation is underway. Then, the processing proceeds to step S503, and the CPU 212 executes a malfunction diagnosis flow for specifying a malfunction part. Detailed description of the malfunction diagnosis flow will be given later.

Next, the processing proceeds to step S504, where the CPU 212 determines whether or not a malfunction part has been specified by the step S503 malfunction diagnosis flow, and when a malfunction part can be specified, the process proceeds to step S505, where a screen indicating the malfunction part is displayed on the operation unit 132, and the process ends. On the other hand, if it is determined in step S504 that the malfunction part could not be specified, the processing proceeds to step S506, the CPU 212 displays a screen on the operation unit 132 in which a malfunction part is not displayed, and this process ends.

According to this flow, it is possible to execute a malfunction diagnosis flow when an abnormality occurs, and display information regarding the malfunction part on the operation unit 132.

Figure 6:
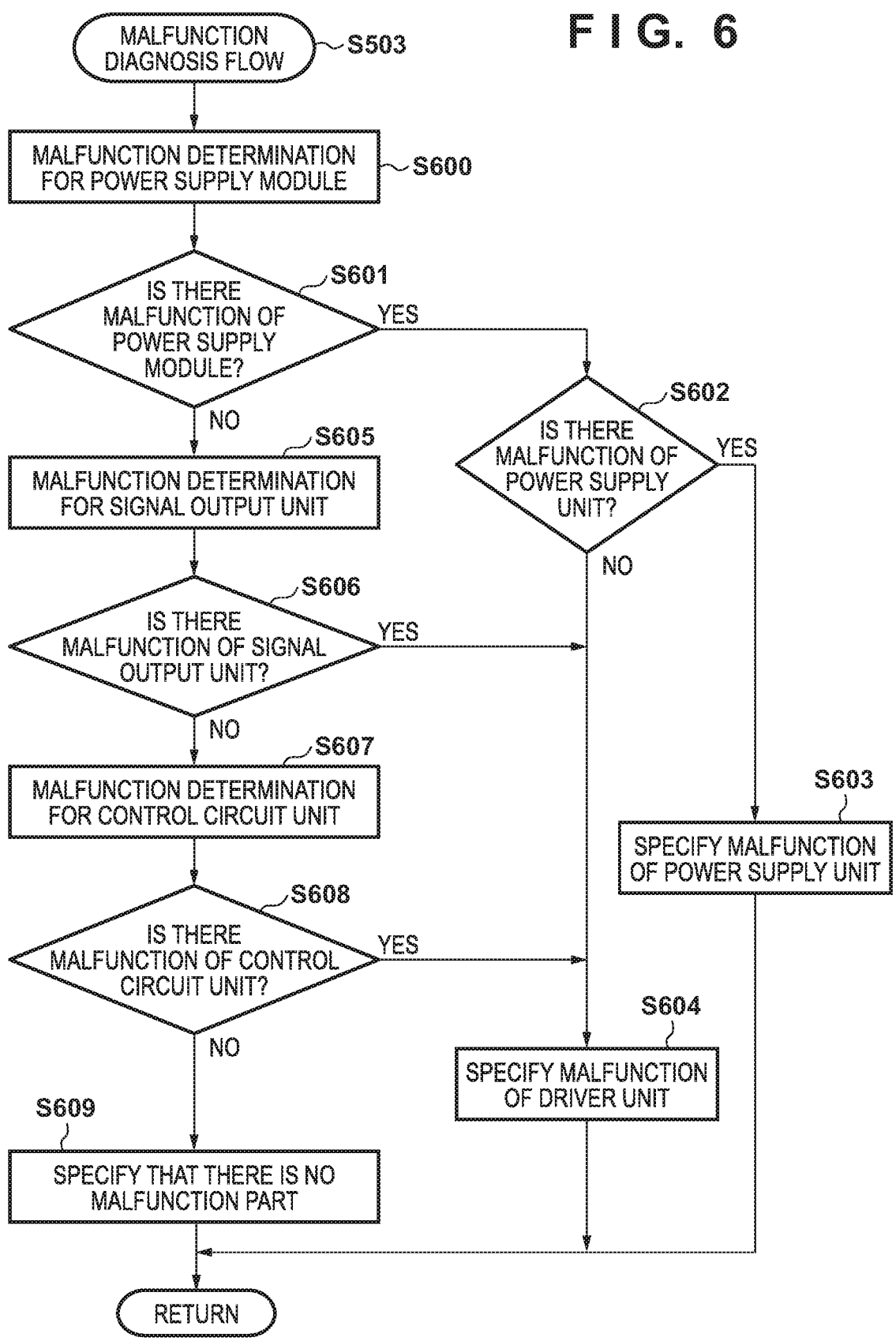
FIG. 6 is a flowchart for describing an example of processing of step S503 of FIG. 5.

FIG. 6 is a flowchart for describing an example of the process of the step S503 of FIG. 5, and here, a malfunction diagnosis flow related to the driving of the attachment/detachment motor 238 will be described as an example.

Here, a malfunction diagnosis flow of an electrical component related to the driving of the attachment/detachment motor 238 is activated, and first, in step S600, the CPU 212 performs a malfunction determination for the power supply module. Note that, in the following description, the CPU 212 obtains a result detected by the detection circuit via the ASIC 231, but the description thereof is omitted.

Here, an output of the +24V_B_FU power supply is detected based on an item of the "attachment/detachment motor" row of the "power supply module" column of the electrical malfunction diagnosis table of FIG. 4. Here, a threshold value of 18V is set with respect to a detection value of the voltage detection circuit 303, and if a detection value is greater than or equal to 18V, it is determined that the power supply module is normal and has no malfunction. On the other hand, if it is less than 18V, it is determined that there is a malfunction in the power supply module because it is abnormal.

In this manner, in step S601, the CPU 212 determines whether or not there is a malfunction in the power supply module, and when it is determined that there is a malfunction in the power supply module, the process proceeds to step S602, and the CPU 212 further determines whether or not there is a malfunction in the power supply unit 200. Here, in order to check the output of the +24V_B_FU power supply, a detection result of the +24V_B voltage by the voltage detection circuit 302 of the driver unit 230 is obtained. Here, similarly to as described above, a threshold value is set to 18V: if the detection result is 18V or more, it is determined that the power supply unit is normal and has no malfunction, and if the detection result is less than 18V, then it is determined that the power supply unit is abnormal and has a malfunction.

In this way, in step S602, the CPU 212 determines whether or not the power supply unit 200 has a malfunction, and if it is determined that the power supply unit 200 has a malfunction, the process proceeds to step S603, where it is specified that the power supply unit 200 has a malfunction, and the process ends. On the other hand, if it is determined in step S602 that the power supply unit 200 does not have a malfunction, the processing proceeds to step S604, the CPU 212 specifies that the driver unit 230 that drives the attachment/detachment motor 238 has a malfunction, and this process ends.

When it is determined in step S601 that the power supply module does not have a malfunction, the processing proceeds to step S605, and the CPU 212 transitions to a malfunction determination for the signal output unit, referring to FIG. 4. Verifying the signal output unit is performed with respect to the motor control signal from the motor driving circuit 235 of the ASIC 231. The motor control signal includes signals such as a rotation direction, a speed, and a drive mode of the motor. The CPU 212 makes a setting with respect to the ASIC 231 so that the motor control signals are outputted at each of the high level and the low level. In the signal detection circuit 304, if the threshold value is set to 2.8V, and a voltage of 2.8V or more is detected when the high level is set, and a voltage of 2.8V or less is detected when the low level is set, it is determined that operation is normal and there is no malfunction, and otherwise it is determined that there is an abnormality and a malfunction.

In this way, in step S606, if it is determined that there is a malfunction in the signal output unit, the processing proceeds to step S604, and the CPU 212 specifies that there is a malfunction in the driver unit 230, and ends this process. However, when it is determined in step S606 that the signal output unit does not have a malfunction, the processing proceeds to step S607, and the CPU 212 executes a malfunction determination for the control circuit unit, based on the table of FIG. 4. Here, the output of the motor driving circuit 235 is checked. For this purpose, the CPU 212 performs a setting with respect to the motor driving circuit 235 of the ASIC 231 so as to cause the attachment/detachment motor 238 to operate. As a result, the motor control signal is output from the signal output unit and input to the motor driving circuit 235. In a state in which the power supply and the signal are input to the control circuit unit as described above, an output from the control circuit unit is detected by the current detection circuit 308. The presence or absence of an abnormality is determined based on whether or not a current flowing from the motor driving circuit 235 to the attachment/detachment motor 238 is greater than or equal to a predetermined value. In the embodiment, when the current flowing through the attachment/detachment motor 238 is greater than or equal to 100 mA, it is determined that the control circuit unit is normal and there is no malfunction, and when the current is less than 100 mA, it is determined that there is a malfunction because there is an abnormality in the control circuit unit.

In this way, in step S608, the CPU 212 determines whether or not there is a malfunction in the control circuit unit, and the processing proceeds to step S604 when it is determined that there is a malfunction in the control circuit unit. Since the motor driving circuit 235 is mounted on the driver unit 230, in step S604, the CPU 212 specifies that there is a malfunction of the driver unit 230, and ends the process. Meanwhile, if the CPU 212 determines in step S608 that there is no malfunction in the control circuit unit, the process proceeds to step S609, and the CPU 212 determines that there is no malfunction part, and ends this process.

Figure 7:
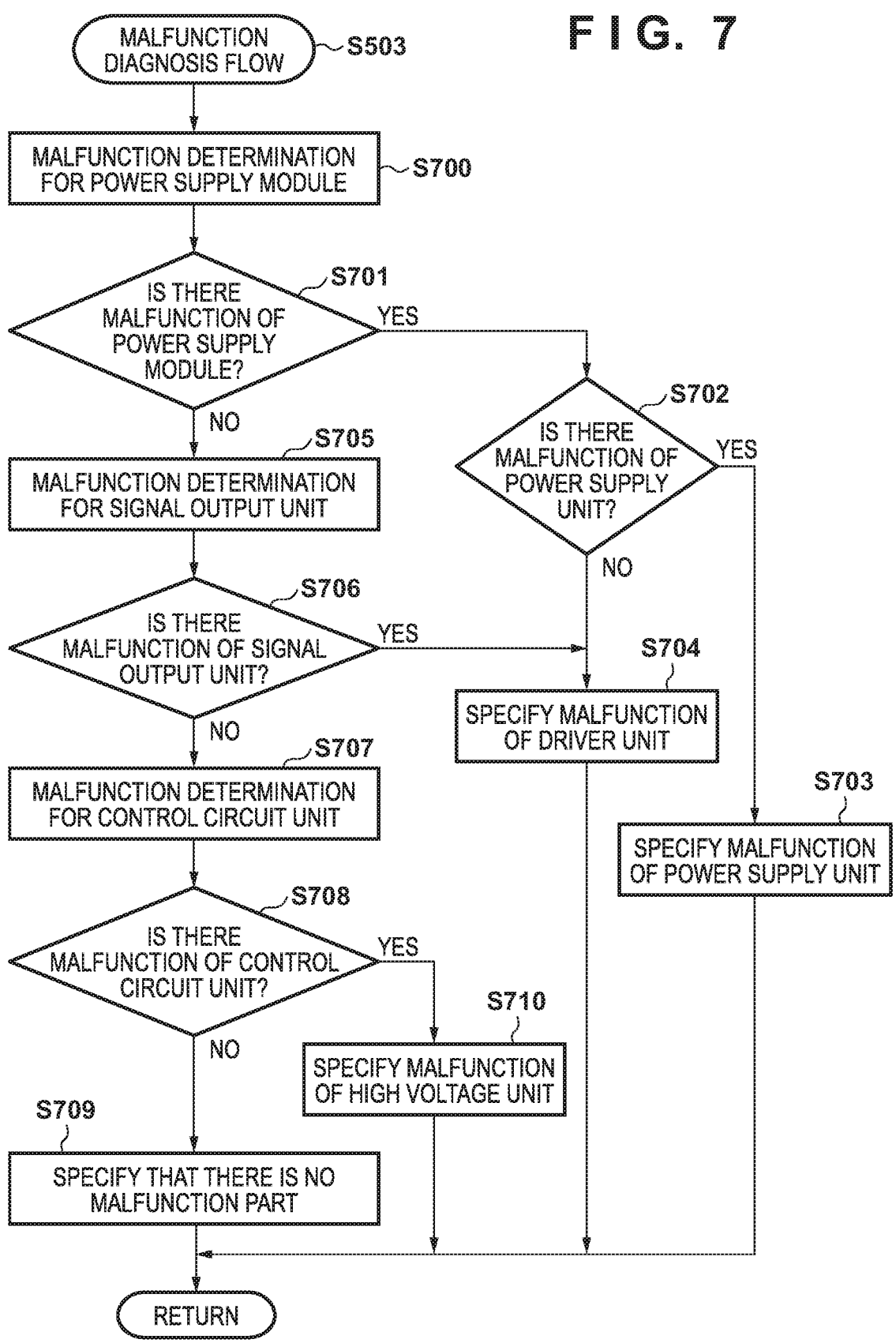
FIG. 7 is a flowchart for describing an example of processing of step S503 of FIG. 5.

FIG. 7 is a flowchart for describing an example of the process of the step S503 of FIG. 5, and here, a malfunction diagnosis flow related to charging DC high-voltage output will be described as an example.

Here, a malfunction diagnosis flow of electrical components associated with the charging DC high-voltage output is activated. Note that, in the following description, the CPU 212 obtains a result detected by the detection circuit via the ASIC 231, but the description thereof is omitted.

First, in step S700, the CPU 212 performs a malfunction determination for the power supply module. Here, when the electrical malfunction diagnosis flow for a charging DC high-voltage output is activated, the CPU 212 checks the output of +24V_A_FU, which is a diagnosis target, from the row of "charging DC output" in the electrical malfunction diagnosis table of FIG. 4. Here, the voltage detection circuit 303 of the driver unit 230 detects whether or not the voltage of +24V_A_FU is greater than or equal to a predetermined value. Here, a threshold value is set to 18V: if the detection result is 18V or more, it is determined that the power supply module is normal and has no malfunction, and if the detection result is less than 18V, then it is determined that the power supply module is abnormal and has a malfunction. In this manner, in step S701, the CPU 212 determines whether or not there is a malfunction in the power supply module in accordance with the malfunction determination for the power supply module, and the processing proceeds to step S702 when it is determined that the power supply module has a malfunction, and further the CPU 212 determines whether or not there is a malfunction in the power supply unit 200. Here, a detection value of the voltage detection circuit 302 is checked in order to check +24V_A in the malfunction determination for the power supply unit 200. If the detected value is normal, the +24V_A power supply system is normal, and it is determined that there is no malfunction, and the process proceeds to step S704, and the CPU 212 specifies the malfunction part as the driver unit 230, and ends this process. On the other hand, in step S702, if the detection value of the voltage detection circuit 302 is abnormal, the CPU 212 determines that the power supply unit 200 has a malfunction and the processing proceeds to step S703, and the CPU 212 specifies the malfunction part as the power supply unit 200, and terminates the process.

When it is determined in step S701 that the power supply module does not have a malfunction, the processing proceeds to step S705, and the CPU 212 executes processing for specifying a malfunction part for the signal output unit. Referring to FIG. 4, verification is executed with respect to the high voltage control signal from the high voltage control unit 233 of the ASIC 231. The high voltage control signal includes an output voltage setting signal and a signal such as a clock for driving a transformer. The CPU 212 sets the ASIC 231 so that charging DC high-voltage control signals are outputted at the high level and the low level, respectively. In the signal detection circuit 304, if the threshold value is set to 2.8V, and a voltage of 2.8V or more is detected when the high level is set, and a voltage of 2.8V or less is detected when the low level is set, it is determined that operation is normal and there is no malfunction. Otherwise it is determined that there is an abnormality, and there is a malfunction in the signal output unit.

In this way, in step S706, if it is determined that there is a malfunction in the signal output unit, the processing proceeds to step S704, and the CPU 212 specifies that there is a malfunction in the driver unit 230, and ends this process. However, when the CPU 212 determines in step S706 that the signal output unit does not have a malfunction, the process proceeds to step S707, and the CPU 212 executes a malfunction determination for the control circuit unit. Here, from FIG. 4, the output check is performed for the charging DC high-voltage circuit 305, which is the control circuit unit for the charging DC high-voltage output. For this purpose, the CPU 212 sets the high voltage control unit 233 of the ASIC 231 to output −1000V. The output current from the charging DC high-voltage circuit 305 at this time is detected by the current detection circuit 306, and when the detection value is less than or equal to 20 μA, it is determined that a malfunction has occurred due to an output abnormality of the charging DC high-voltage circuit 305.

In this manner, the processing proceeds to step S708, and when the CPU 212 determines in the malfunction determination of the control circuit unit of step S707 that the control circuit unit has a malfunction, the process proceeds to step S710, and the CPU 212 specifies that this is a malfunction of the high voltage unit 237 because the high voltage control circuit of the charging DC high-voltage outputs is mounted in the high voltage unit, and ends this process. Meanwhile, if the CPU 212 determines in step S708 that there is no malfunction in the control circuit unit, the process proceeds to step S709, and the CPU 212 specifies that there is no malfunction part, and ends this process. Note that, in the process of specifying the malfunction part of the charging DC high-voltage output, the determination of the malfunction part by the operation of the load is not performed.

In addition, similarly to the malfunction diagnosis of the charging DC high-voltage output, processing for the malfunction diagnosis of the electrical components related to the high voltage of the development DC output, the primary transfer DC output, and the secondary transfer DC output is also performed by deciding the power supply module, the signal output unit, and the control circuit unit that are diagnosis targets from the electrical malfunction diagnosis table of FIG. 4.

Note that the signal detection circuit 304, the current detection circuit 306, and the motor driving circuit 235 are provided for each of the high voltage outputs, and a malfunction diagnosis flow is executed for each of them in a manner similar to that as described above. In this manner, the malfunction parts of the power supply unit 200, the driver unit 230, and the high voltage unit 237 associated with each high voltage are specified.

Next, types of malfunction diagnosis flows will be described. The malfunction diagnosis flow executed for each individual error code includes a first malfunction diagnosis type which can be executed even in a state where a sheet remains in the apparatus, and a second malfunction diagnosis type which cannot be executed in a state where a sheet remains in the apparatus because of the possibility of the sheet and the apparatus being damaged. Description is made giving specific examples below.

Figure 9:
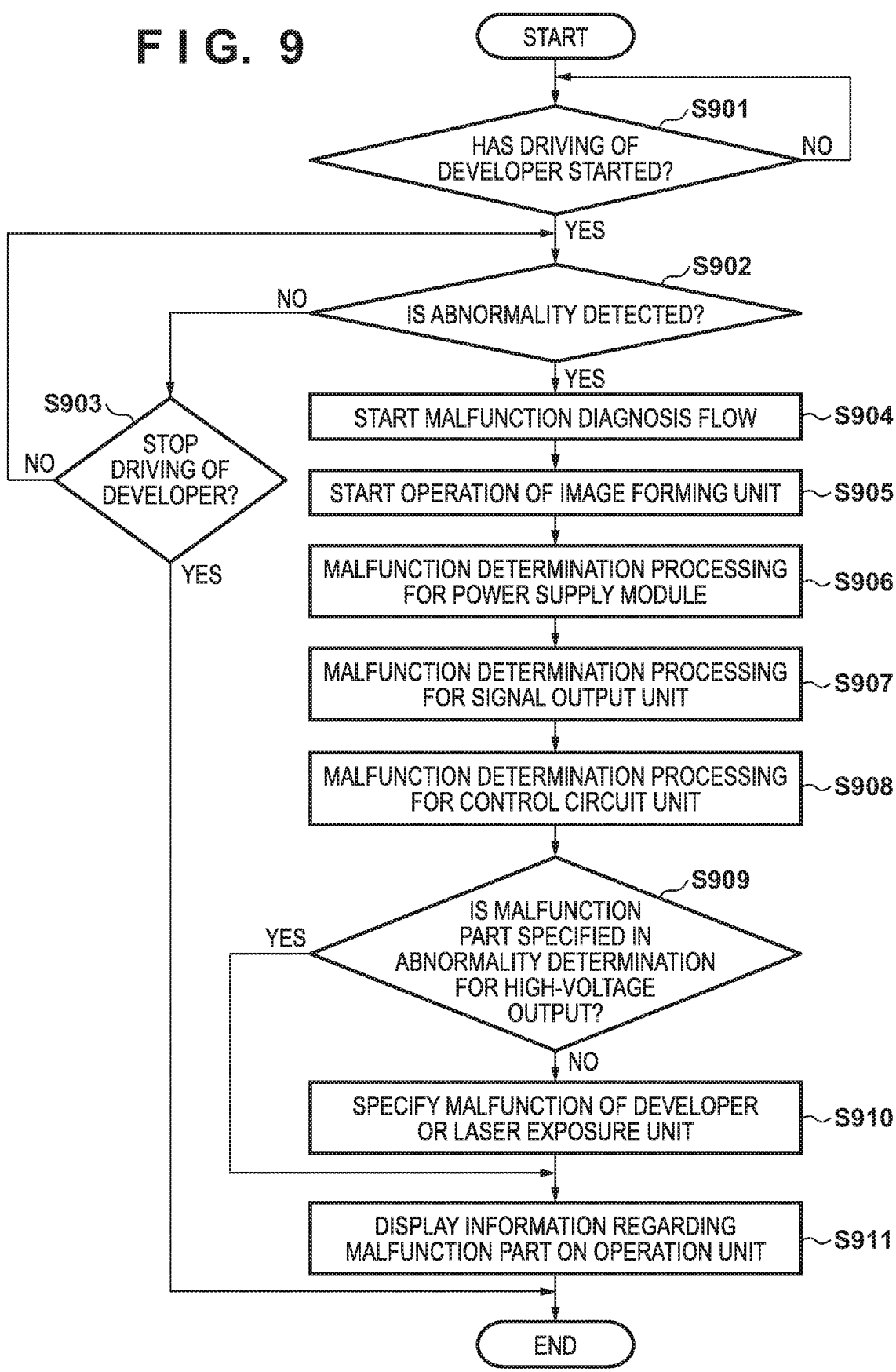
FIG. 9 is a flowchart for describing a series of operations from detection of, as an example of a first malfunction diagnosis type, an abnormality of a developer, until a malfunction diagnosis flow is executed in the image forming apparatus according to the embodiment.

FIG. 9 is a flowchart for describing a series of operations from detection of, as an example of a first malfunction diagnosis type, an abnormality of the developer 105, until a malfunction diagnosis flow is executed in the image forming apparatus 100 according to the embodiment. Note that the process described in this flowchart is achieved by the CPU 212 executing programs stored in the ROM 213.

In step S901, the CPU 212 determines whether or not the driving of the developer 105 has been started, and when the driving is started, the process proceeds to step S902, and the CPU 212 executes an abnormality detection process for the developer 105. If no abnormality is detected, the process proceeds to step S903, and processing for step S902 to step S903 are continued until the driving of the developer 105 is stopped. Then, in step S902, the CPU 212 periodically monitors a read value of a toner density sensor (not illustrated) provided in the developer 105, and upon detecting a state in which the toner density deviates from within a predetermined range, it determines that an abnormality has occurred and the processing proceeds to step S904, and after stopping the operation of the image forming apparatus 100, the CPU 212 starts a malfunction diagnosis flow.

When the malfunction diagnosis flow is started, the process proceeds to step S905, and the CPU 212 starts the operation of the image forming unit 123 in order to execute the malfunction diagnosis of the charging DC high-voltage output and the development DC high-voltage output that is described in an aforementioned malfunction diagnosis flow.

Next, proceeding to step S906, when preparations for the operation of the image forming unit 123 are complete and a state where it is possible to apply high voltages is entered, the CPU 212 executes a malfunction determination process for the power supply module. Next, proceeding to step S907, the above-described malfunction determination process for the signal output unit is executed. Next, proceeding to step S908, the CPU 212 performs a malfunction diagnosis by executing a malfunction determination process of the control circuit unit, including a malfunction diagnosis of the charging DC high-voltage output and the development DC high-voltage output. Detailed description of each of these malfunction determinations is omitted because it has been described in an above-mentioned malfunction diagnosis flow.

Then, proceeding to step S909, the CPU 212 determines whether or not it was possible to specify a malfunction part in accordance with the abnormality determination of the high-voltage outputs up to this point. Here, if the malfunction part cannot be specified, the process proceeds to step S910, but when the malfunction part can be specified, the process proceeds to step S911, and the specified malfunction part is displayed on the operation unit 132. Meanwhile, in step S910, the CPU 212 determines that the charging DC high-voltage output and the developing DC high-voltage output are normal and are not caused by the discharge of toner or magnetic carriers from the developer 105 due to abnormalities in the high-voltage output. It is specified that there is a malfunction of the developer 105 or the laser exposure unit 104, and the process proceeds to step S911. In step S911, the CPU 212 displays the specified malfunction part on the operation unit 132, and ends this process.

Note that the malfunction diagnosis flow of the developer 105 is of the first malfunction diagnosis type which can be executed even in a state in which a sheet remains in the machine because there is no effect on a sheet in a conveyance path.

Next, as a second malfunction diagnosis type, a series of operations from the detection of an abnormality of the intermediate transfer belt attachment/detachment mechanism to execution of a malfunction diagnosis flow will be described with reference to the flowcharts of FIGS. 10A and 10B and the intermediate transfer belt attachment/detachment mechanism diagram of FIG. 8.

Figure 10A:
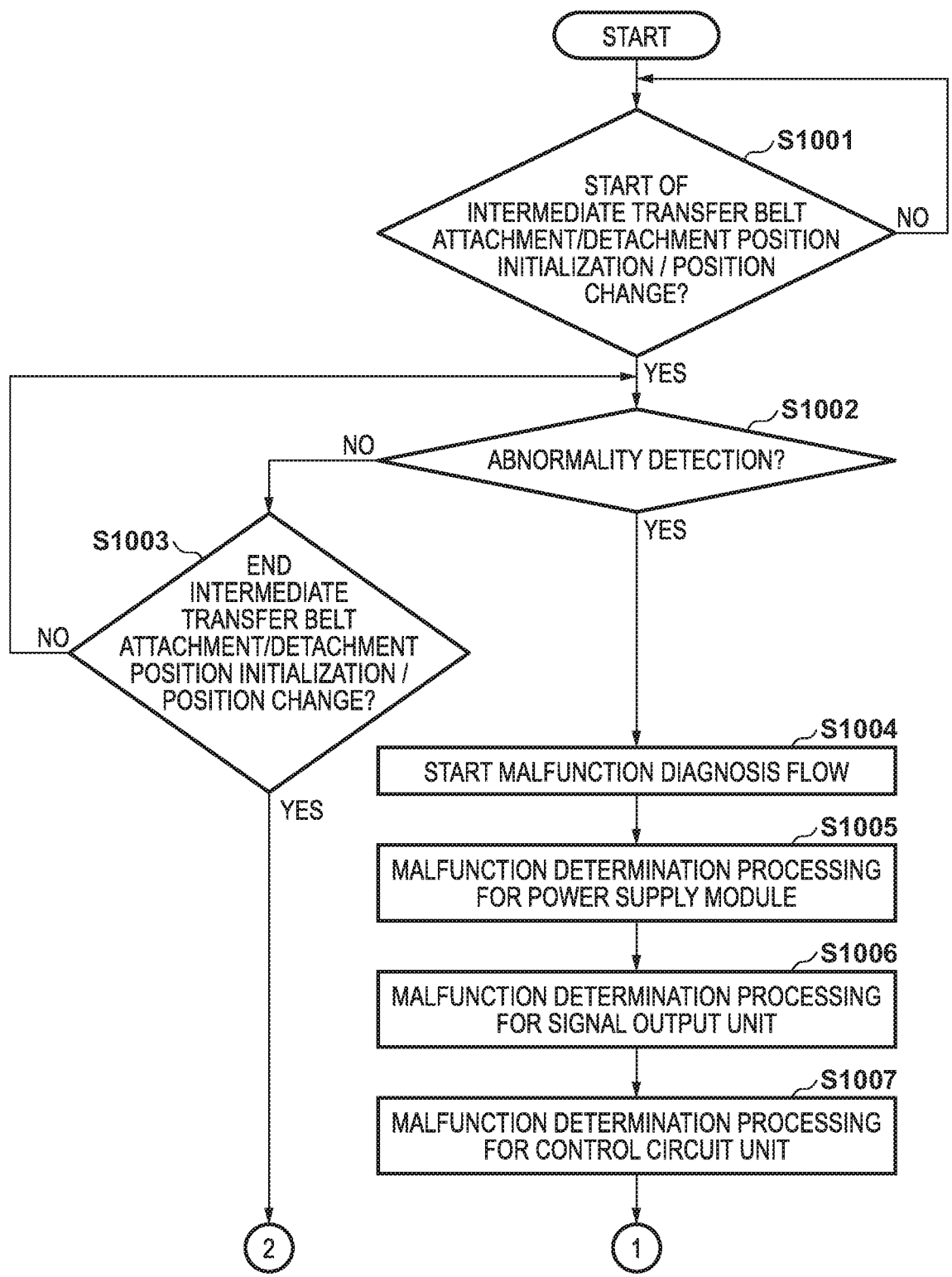
FIGS. 10A and 10B are flowcharts for describing a series of operations from detection of, as an example of a second malfunction diagnosis type, an abnormality of an intermediate transfer belt attachment/detachment mechanism, until a malfunction diagnosis flow is executed in the image forming apparatus according to the embodiment.
Figure 10B:
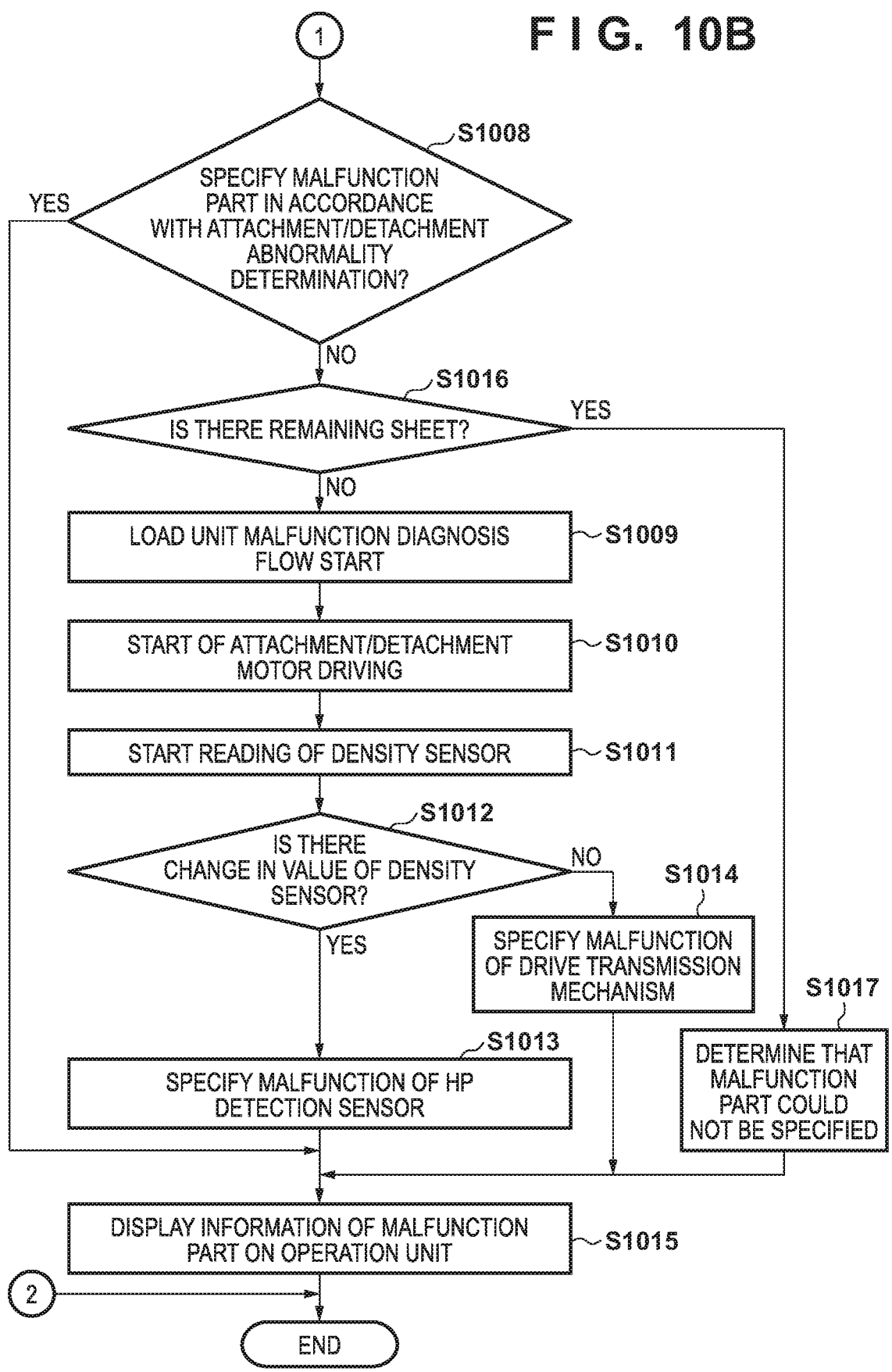

FIGS. 10A and 10B are flowcharts for describing a series of operations from detection of, as an example of a second malfunction diagnosis type, an abnormality of the intermediate transfer belt attachment/detachment mechanism 239 until a malfunction diagnosis flow is executed in the image forming apparatus 100 according to the embodiment. Note that the process described in this flow chart is achieved by the CPU 212 executing programs stored in the ROM 213.

First, in step S1001, the CPU 212 determines whether or not the driving is started by a change operation of the attachment/detachment position or an initialization operation of the intermediate transfer belt attachment/detachment mechanism 239, and the processing proceeds to step S1002 when the operation is started, and the CPU 212 starts the abnormality detection process of the intermediate transfer belt attachment/detachment mechanism 239. In step S1002, the CPU 212 determines whether or not the abnormality of the intermediate transfer belt attachment/detachment mechanism 239 is detected, and if the abnormality is not detected, the processing proceeds to step S1003, and the CPU 212 continues the abnormality detection process of step S1002 until the initialization operation or the attachment/detachment position changing operation of the intermediate transfer belt attachment/detachment mechanism 239 is completed and the driving is stopped.

On the other hand, even if a predetermined period elapses after the operation of the intermediate transfer belt attachment/detachment mechanism 239 is started by the attachment/detachment motor 238 in step S1002, if it is detected that the initialization operation or the attachment/detachment position changing operation is not completed, it is determined that an abnormality has occurred and the process proceeds to step S1004. In step S1004, the CPU 212 starts the malfunction diagnosis flow after the operation of the image forming apparatus 100 undergoes an emergency stop. Then, the processing proceeds to step S1005, and the CPU 212 executes the malfunction diagnosis flow for the attachment/detachment motor 238 described in an above-mentioned malfunction diagnosis flow, and executes a malfunction determination process for the power supply module. Next, in step S1006, a malfunction determination process for the signal output unit and a malfunction determination for the control circuit unit in step S1007 are performed in this order. Detailed description of each of these malfunction determinations is omitted because it has been described in the above-mentioned malfunction diagnosis flow.

Figure 15:
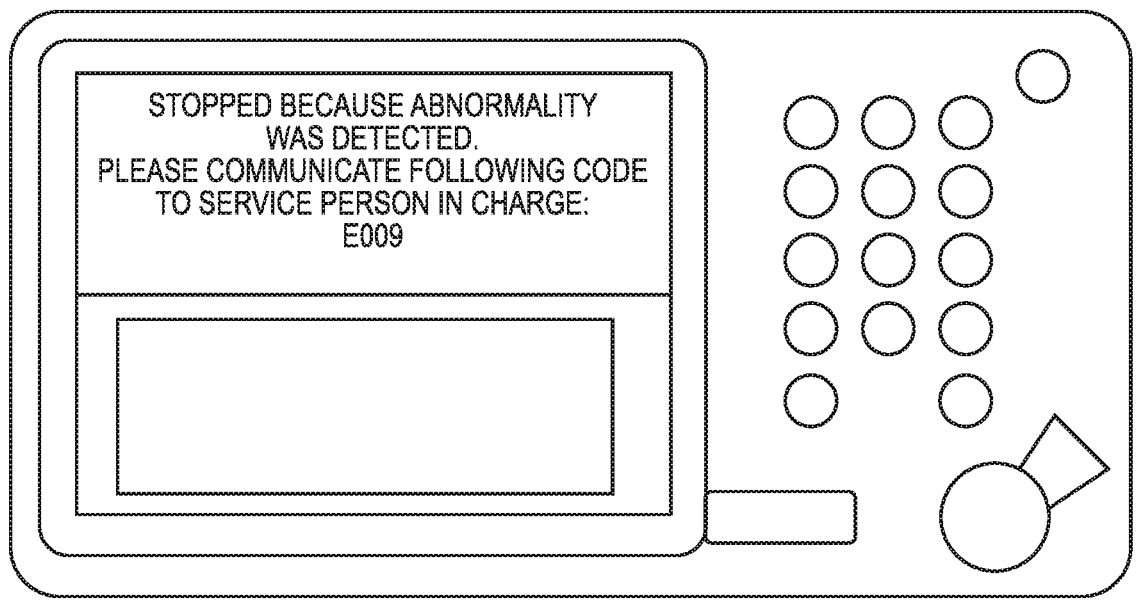
FIG. 15 depicts a view illustrating an example of an error screen in which a malfunction part is not specified.

Then, proceeding to step S1008, the CPU 212 determines whether or not it has been possible to specify the malfunction part by attachment/detachment abnormality checking processing so far, and the processing proceeds to step S1015 when it has been possible to specify the malfunction part. On the other hand, when it has not been possible to specify the malfunction part in step S1008, the processing proceeds to step S1016, and it is determined whether or not there is a sheet remaining in a conveyance path. If it is determined that there is no sheet, the process proceeds to step S1009, and the malfunction diagnosis flow for the load unit is started. On the other hand, if it is determined that there is a remaining sheet, the process proceeds to step S1017, and the CPU 212, without performing the load unit malfunction diagnosis flow, assumes that the malfunction part cannot be specified, and displays a screen, which does not specify the malfunction part, on the operation unit 132, for example, as illustrated in FIG. 15. Description is given later in regard to a detailed reason why the load unit malfunction diagnosis flow is performed in a state where there is no remaining sheet, but this is to prevent the intermediate transfer belt 108 and the sheet from being damaged.

Upon starting the malfunction diagnosis flow for the load unit in step S1009, the process proceeds to step S1010, and the CPU 212 starts driving the attachment/detachment motor 238, and, in step S1011, starts reading the density sensor 112.

As described with reference to the intermediate transfer belt attachment/detachment mechanism 239 in FIG. 8, the attachment/detachment position is changed by starting the driving of attachment/detachment motor 238, but the contact state between the intermediate transfer belt 108 and the density sensor 112 is also changed by changing the attachment/detachment position. Therefore, if the attachment/detachment position is normally switched, a difference occurs in read values of the density sensor 112 between the all color release position of FIG. 8C and the monochrome contact position and the all color contact position in FIGS. 8A and 8B. Based on the above, the CPU 212 samples the read value of the density sensor 112 until a predetermined period of time has elapsed, and in step S1012 the CPU 212 determines whether or not the read value changes by a predetermined value or more. If it is determined here that there is such a change, the process proceeds to step S1013, and the CPU 212 specifies that, although the attachment/detachment operation has been performed, the home position detection sensor 800 does not react, in other words that the home position detection sensor 800 has malfunctioned, and the process proceeds to step S1015. On the other hand, in step S1012, when the CPU 212 determines that the value of the density sensor 112 does not change by the predetermined value or more, the process proceeds to step S1014, and the CPU 212 determines that the attachment/detachment operation has not been performed, and specifies that there is a malfunction of the drive transmission mechanism such as a gear, and then the process proceeds to step S1015. In step S1015, the CPU 212 displays information regarding the malfunction part.

In the malfunction diagnosis flow corresponding to an abnormality of the intermediate transfer belt attachment/detachment mechanism 239, there is a possibility that the intermediate transfer belt 108 or the sheet will be damaged when there is a remaining sheet in the movable portion in which the attachment/detachment operation is performed. Therefore, the second malfunction diagnosis type for executing a malfunction diagnosis is used after notifying the user through the operation unit 132 that there is a sheet remaining in the apparatus and urging collection of the sheet, and the user removes the sheet in the apparatus.

[Malfunction Diagnosis Start Timing Control]

Next, the control of the start timing of the malfunction diagnosis flow in the above-described second malfunction diagnosis type will be described.

FIG. 13 is a flowchart for describing processing when the image forming apparatus 100 according to the embodiment detects a malfunction of the second malfunction diagnosis type. Note that the process described in this flow chart is achieved by the CPU 212 executing programs stored in the ROM 213.

First, in step S1301, when an abnormality is detected, the processing proceeds to step S1302, and the CPU 212 determines an error code from the content of the abnormality detected, and causes operation of the image forming apparatus 100 to stop. Then, proceeding to step S1303, the CPU 212 determines the diagnosis type of the malfunction from the malfunction diagnosis type table which associates an error code with a malfunction diagnosis type as illustrated in FIG. 12, for example, and is stored in the ROM 213.

FIG. 12 depicts a view illustrating an example of a malfunction diagnosis type table according to the embodiment.

The items of the abnormality detection content in FIG. 12 are described so that content of an error code can be easily understood, and only the error code and the malfunction diagnosis type information are actually stored in the ROM 213. If the numerical value of the malfunction diagnosis type is "1", this means the first malfunction diagnosis type, and if the numerical value of the malfunction diagnosis type is "2", this means the second malfunction diagnosis type.

When the malfunction diagnosis type is determined in step S1303, the process proceeds to step S1304, and the CPU 212 determines whether or not a malfunction diagnosis to be performed is of the second malfunction diagnosis type. If it is not of the second malfunction diagnosis type, the process proceeds to step S1308 and a malfunction diagnosis flow is executed. On the other hand, if the malfunction diagnosis type is the second malfunction diagnosis type, the process proceeds to step S1305, and the CPU 212 determines whether or not there is a remaining sheet in the apparatus. Here, if it is determined that there is no remaining sheet in a conveyance path, the process proceeds to step S1308, but if it is determined that there is a remaining sheet, the process proceeds to step S1306 and the CPU 212 displays, for example, a screen prompting removal of the sheet as illustrated in FIG. 11 on the operation unit 132.

Figure 11:
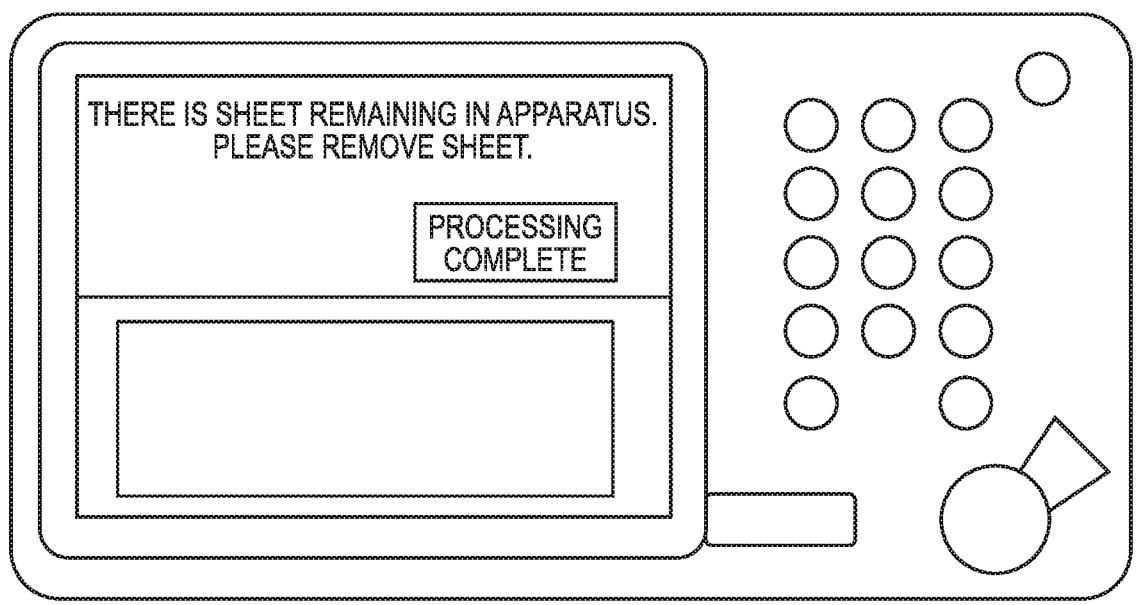
FIG. 11 depicts a view illustrating an example of a screen that prompts removal of a sheet and is displayed on an operation unit of the image forming apparatus according to the embodiment.

FIG. 11 depicts a view illustrating an example of a screen that prompts removal of a sheet and is displayed on the operation unit 132 of the image forming apparatus 100 according to the embodiment.

Upon removing the remaining sheet, the user presses the "process complete" button. As a result, the CPU 212 can detect that removal of a remaining sheet is complete.

In step S1309, the CPU 212 determines whether or not a predetermined period of time has elapsed in a state where the screen of FIG. 11 is displayed. When it is determined that the predetermined period of time has elapsed in step S1309, the process proceeds to step S1308 on the assumption that there is a low possibility that the user will remove the sheet, and the process starts the malfunction diagnosis flow. At this time, as described with reference to FIGS. 10A and 10B, only the electrical malfunction diagnosis flow which can be executed regardless of the presence or absence of the sheet is executed, and the load unit malfunction diagnosis flow is not executed.

On the other hand, when it is determined that the user has explicitly made a remaining sheet removal complete instruction, for example, when the "process complete" button is pressed on the screen of FIG. 11, the process proceeds from step S1310 to step S1308, and a malfunction diagnosis flow is started regardless of whether or not a remaining sheet is actually removed.

In addition, in step S1307, when the CPU 212 determines that the remaining sheet has actually been removed, for example, in accordance with a signal from a sensor, the process proceeds to step S1308, and the CPU 212 executes both the electric malfunction diagnosis flow and the load unit malfunction diagnosis flow.

Figure 14:
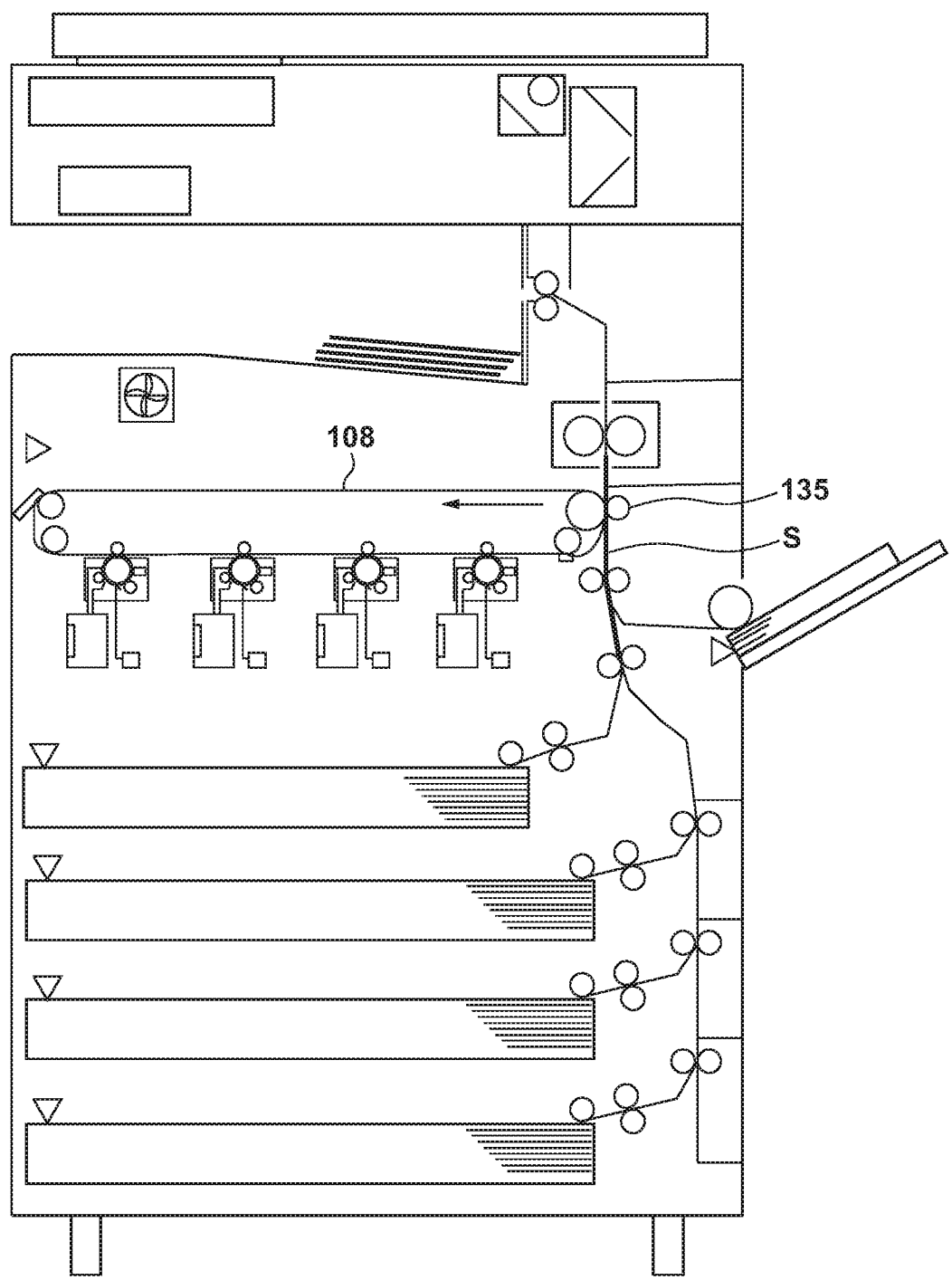
FIG. 14 is a diagram for describing a case where there is a sheet remaining in the image forming apparatus according to the embodiment.

Note that, in the embodiment, the removal of a sheet is urged when a sheet is present in a conveyance path in the image forming apparatus 100, but configuration may be taken such that the removal of a sheet is urged only when a sheet is present between the intermediate transfer belt 108 and the secondary transfer roller 135 as illustrated in FIG. 14, and the malfunction diagnosis flow is started without urging the removal of a remaining sheet when a sheet remains in another place.

FIG. 14 is a diagram for describing a case where there is a sheet remaining in the image forming apparatus 100 according to the embodiment. Here, this illustrates a state where the sheet S remains between the intermediate transfer belt 108 and the secondary transfer roller 135.

As described above, according to the embodiment, the malfunction diagnosis type is first determined, and it is determined whether or not to execute a subsequent malfunction diagnosis process in accordance with the malfunction diagnosis type. As a result, when the malfunction diagnosis is performed, it is possible to eliminate the occurrence of trouble such as, for example, breakage of a part due to a remaining sheet.

In addition, there is an effect that the user can be presented with a measure that is necessary in order to execute a malfunction diagnosis.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-000739, filed on Jan. 7, 2019, which is hereby incorporated by reference herein in its entirety.

What is claimed is:

1. An image forming apparatus, comprising:
   one or more memory devices that store instructions; and
   a controller having circuitry or one or more processors that execute the instructions stored in the one or more memory devices, the controller being configured to
   detect an abnormality in the image forming apparatus;
   display a screen prompting a user to remove a print medium in a case that it is determined it is necessary to remove the print medium remaining in the image forming apparatus based on details of the abnormality;
   in a case that the print medium is not removed within a predetermined time period after the screen has been displayed, execute an electrical malfunction diagnosis process to specify a malfunctioning part in the image forming apparatus without executing a load unit malfunction diagnosis process that should not be executed while the print medium is remaining in the image forming apparatus; and
   in a case that the print medium is removed within the predetermined time period after the screen has been displayed, execute the electrical malfunction diagnosis process and the load unit malfunction diagnosis process.

2. The image forming apparatus according to claim 1, wherein the electrical malfunction diagnosis is able to be executed in a state where a print medium remains in the image forming apparatus and the load unit malfunction diagnosis process that is not able to be executed in a state where the print medium remains in the image forming apparatus.

3. The image forming apparatus according to claim 1, wherein the electrical malfunction diagnosis process is able to be executed in a state where a print medium remains in the image forming apparatus and the load unit malfunction diagnosis process that is not able to be executed in a state where the print medium remains in the image forming apparatus.

4. The image forming apparatus according to claim 1, wherein the controller is further configured to:
stop the operation of the image forming apparatus in accordance with having detected the abnormality in the image forming apparatus.

5. The image forming apparatus according to claim 1, wherein the controller is further configured to:
store a diagnosis target for specifying the malfunctioning part in association with a diagnostic item corresponding to the diagnosis target,
specify the diagnosis target corresponding to the abnormality in accordance with having detected the abnormality.

6. The image forming apparatus according to claim 1, wherein the load unit malfunction diagnosis process includes driving of a motor for driving an attachment/detachment mechanism for switching a state of contact of an intermediate transfer belt and a primary transfer roller with respect to a photosensitive drum in the image forming apparatus and reading an output of a density sensor that is changed in accordance with a position of the attachment/detachment mechanism.

7. The image forming apparatus according to claim 5, wherein the diagnosis target includes at least one of a motor and a power supply.

8. The image forming apparatus according to claim 5, wherein the diagnostic item includes at least one of an output of the power supply, a level of a control signal of the power supply, a level of a control signal of the motor, and a current value flowing through a driving circuit of the motor.

9. The image forming apparatus according to claim 5, further comprising:
a driving unit having a motor driving circuit or a voltage generation unit configured to generate a driving voltage;
a control unit configured to control the driving unit;
a power supply unit configured to supply power to the driving unit and the control unit,
wherein the diagnostic item includes information regarding a power supply from the power supply unit, a motor control signal for controlling the motor driving circuit, or a voltage control signal for controlling the voltage generation unit.

10. The image forming apparatus according to claim 5, wherein the diagnostic item of the electrical malfunction diagnosis process includes at least one of an output of a power supply, a level of a control signal of the power supply, a level of a control signal of a motor, and a current value flowing through a driving circuit of the motor.

11. The image forming apparatus according to claim 9, further comprising:
a voltage detection unit configured to detect a power supply voltage supplied from the power supply unit to the driving unit;
a signal detection unit configured to detect the motor control signal or the voltage control signal; and
a detection unit configured to detect an operation of the motor driving circuit with respect to the motor control signal or an operation of the voltage generation unit with respect to the voltage control signal,
wherein the controller executes the load unit malfunction diagnosis process based on a result of detection of the voltage detection unit and the detection unit.

12. The image forming apparatus according to claim 9, wherein, in a case that the load unit malfunction diagnosis process is executed in accordance with the motor control signal for controlling the motor driving circuit as the diagnostic item, the controller, in a case where the print medium is remaining in the image forming apparatus, waits until the print medium has been removed and then executes the load unit malfunction diagnosis process for the abnormality.

13. The image forming apparatus according to claim 11, wherein the detection unit detects a value of a current flowing through the motor driving circuit or a value of a current flowing through the voltage generation unit to detect the operation of the motor driving circuit or the operation of the voltage generation unit.

14. The image forming apparatus according to claim 11, wherein supply of power is performed from the power supply unit to the driving unit and the control unit via respective fuses.

15. A malfunction diagnosis method of an image forming apparatus, the method comprising:
detecting an abnormality in the image forming apparatus;
displaying a screen prompting a user to remove a print medium in a case that it is determined it is necessary to remove the print medium remaining in the image forming apparatus based on details of the abnormality;
in a case that the print medium is not removed within a predetermined time period after the screen has been displayed, executing an electrical malfunction diagnosis process to specify a malfunctioning part in the image forming apparatus without executing a load unit malfunction diagnosis process that should not be executed while the print medium is remaining in the image forming apparatus; and
in a case that the print medium is removed within the predetermined time period after the screen has been displayed, executing the electrical malfunction diagnosis process and the load unit malfunction diagnosis process.

16. The malfunction diagnosis method according to claim 15, wherein, in a case where the print medium is remaining in the image forming apparatus and it is determined it is necessary to remove the print medium remaining in the image forming apparatus, the load unit malfunction diagnosis process for the abnormality is executed after waiting until the print medium has been removed.

17. A non-transitory computer readable storage medium storing a program for causing a processor to execute a malfunction diagnosis method of an image forming apparatus, the method comprising:
detecting an abnormality in the image forming apparatus;
displaying a screen prompting a user to remove a print medium in a case that it is determined it is necessary to remove the print medium remaining in the image forming apparatus based on details of the abnormality;
in a case that the print medium is not removed within a predetermined time period after the screen has been displayed, executing an electrical malfunction diagnosis process to specify a malfunctioning part in the image forming apparatus without executing a load unit malfunction diagnosis process that should not be executed while the print medium is remaining in the image forming apparatus; and
in a case that the print medium is removed within the predetermined time period after the screen has been displayed, executing the electrical malfunction diagnosis process and the load unit malfunction diagnosis process.

\* \* \* \* \*